(No Model.)

L. H. PEARCE.
MEANS FOR VAPORIZING AND DISTILLING LIQUIDS.

No. 348,772. Patented Sept. 7, 1886.

WITNESSES:
E. B. Bolton
Geo. Bainton

INVENTOR:
Lionel Harry Pearce
By his Attorneys,
Burke, Fraser & Connell

United States Patent Office.

LIONEL HARVEY PEARCE, OF COALBOURNE BROOK, STOURBRIDGE, COUNTY OF WORCESTER, ENGLAND.

MEANS FOR VAPORIZING AND DISTILLING LIQUIDS.

SPECIFICATION forming part of Letters Patent No. 348,772, dated September 7, 1886.

Application filed November 28, 1885. Serial No. 184,169. (No model.) Patented in England March 20, 1885, No. 3,597; in France October 14, 1885, No. 159,034, and in Germany October 14, 1885, No 12,039.

*To all whom it may concern:*

Be it known that I, LIONEL HARVEY PEARCE, a subject of the Queen of Great Britain and Ireland, residing at Coalbourne Brook, Stourbridge, in the county of Worcester, England, have invented certain new and useful Means for Vaporizing and Distilling Liquids, (for which I have been granted Letters Patent in Great Britain, No. 3,597 of March 20, 1885; in France, No. 159,034 of October 14, 1885, and in Germany No. 12,039 of October 14, 1885,) of which the following is a specification.

The object of this invention is to provide an improved means whereby water or other liquids may be heated, and, if necessary, vaporized and subsequently distilled, the same being especially applicable under circumstances where heat resulting from the combustion of fuel is not available.
For the purpose of this invention I employ mechanical energy to generate friction, and apply the heat resulting therefrom to the liquid under treatment. I also employ means for condensing the vapor of the water or other liquid.

My invention will be hereinafter fully described, and its novel features carefully defined in the claims.

Figure 1:
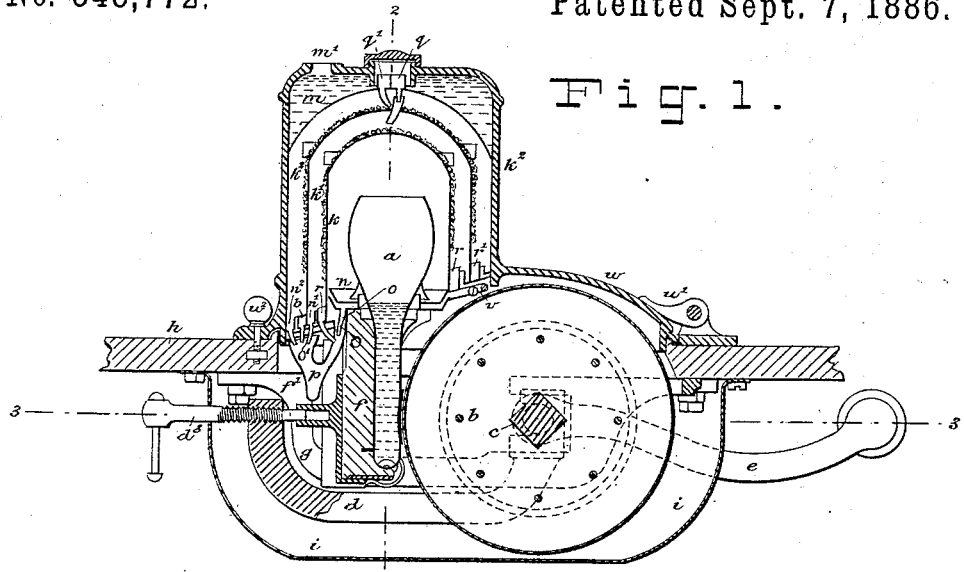
Figure 2:
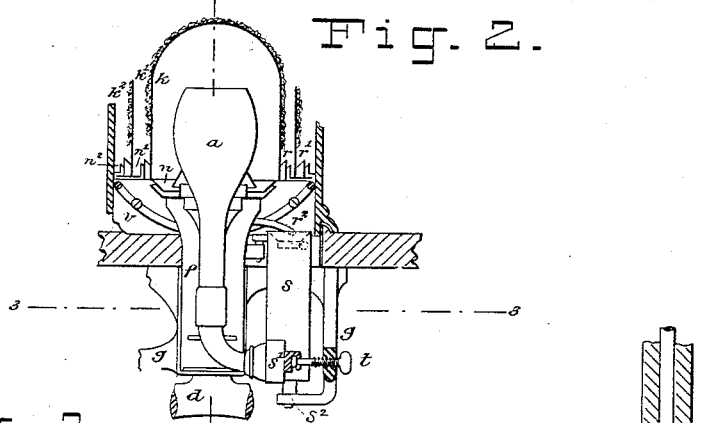
Figure 3:
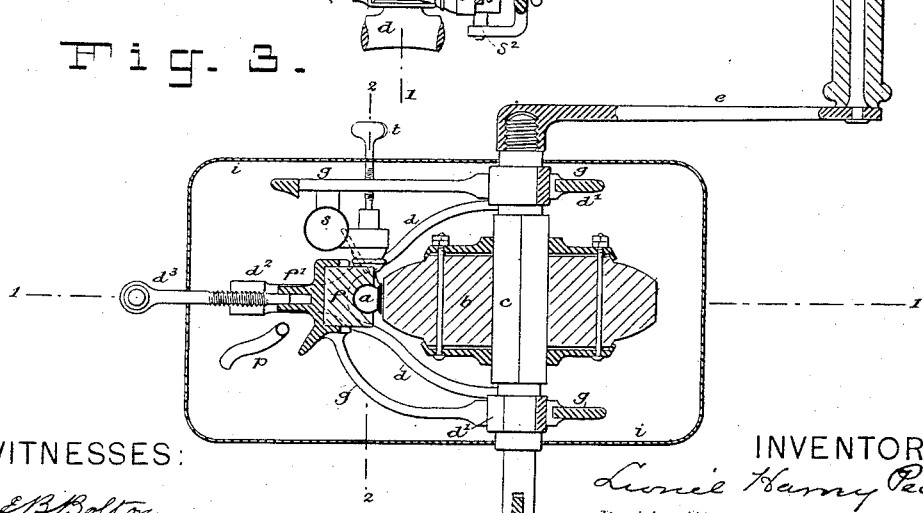

My invention is illustrated in the accompanying drawings, wherein Figure 1 is a vertical longitudinal section in the plane indicated by the lines 1 1 in Figs. 2 and 3. Fig. 2 is a vertical transverse section in the plane indicated by lines 2 2 in Figs. 1 and 2. Fig. 3 is a horizontal section in the plane indicated by lines 3 3 in Figs. 1 and 2.

Like letters designate like parts in all the figures.

In Fig. 2 portions of the interior domes are broken away.

In the present illustration of this invention the liquid to be heated is contained in a vessel, $a$, which may be cup-shaped as to its upper part. Its lower part consists of a hollow stem, against the side of which the periphery of a wheel or rubber, $b$, bears with a regulated pressure. The wheel $b$, which may be of wood, is mounted on a spindle, $c$, carried in forked bearings $d'$ $d'$ of the movable frame $d$. The spindle $c$ is provided at either or both extremities with a crank-handle, such as $e$, whereby the wheel $b$ may be rotated. The vessel $a$ is carried in a block, $f$, preferably of wood, secured in a portion of the fixed framing, $g$, suitably formed for its reception. The movable frame $d$ is formed with an extension, $d^2$, through which an adjusting-screw, $d^3$, passes, the extremity of the latter entering a socket, $f'$, formed in the fixed frame, and bearing on a washer or other packing of yielding character, with which the socket is lined. A stiff spiral spring may be substituted for the packing, if preferred. On tightening the screw $d^3$ the movable frame $d$, carrying the spindle-bearings $d'$ $d'$, is caused to slide in the frame $g$, and to press the periphery of the wheel $b$ against the side of the heating-vessel $a$. $h$ is a wooden plank, to which the whole apparatus is attached, and $i$ a shield for protecting the underneath portions from injury. The vessel $a$ having been charged with liquid and the wheel $b$ rotated, the friction of the latter upon the surface of the vessel generates heat, which is communicated to the inclosed liquid.

The operation described may be continued to the extent of vaporizing the liquid, and the vapor evolved may be subsequently condensed. The apparatus illustrated in the accompanying drawings includes means for this purpose, and is of the following description: The heating and evaporating vessel $a$ is surmounted by two or more concentric domes, $k$ $k'$, clad with flannel or other material adapted to retain water or other cooling agent, which is fed to the exteriors of the domes by means of the drip-nozzles $q$ $q'$. Instead of clothing the domes $k k'$, their outer surfaces may be roughened or corrugated, with a view to retaining the cooling agent. The domes $k k'$ are inclosed within a cylindrical chamber, $k^2$, in the upper portion of which is formed a supply-tank, $m$, for the cooling-water. The tank $m$ also supplies the heating-vessel $a$, in a manner which will be described hereinafter. The vapor escaping from the vessel $a$ is condensed upon the inner surface of the dome $k$ and drains into trough $n$, whence it passes by the conduit $o$ to the delivery-pipe $p$. During this process the dome $k$ becomes heated and causes a portion of the water applied to its exterior to be evaporated. This vapor is in turn condensed upon the inner surface of the dome $k'$, and, draining into the trough $n'$, finds its way by the conduit $o'$ to the delivery-pipe $p$. A similar process of vaporization ensues from the exterior of the dome $k'$, this vapor being condensed on the under side of the tank $m$ and the interior of the cylindrical chamber $k^2$, the product flowing from the trough $n^2$ to the pipe $p$, as before. The troughs $n'$ $n^2$ are inclined in the direction of their outlet-conduits, communicating with the pipe $p$.

For supplying water to the exteriors of the domes $k k'$, the tank $m$ is filled through the orifice $m'$. By applying the mouth to this orifice and blowing into the tank the water is caused to flow through the ducts $q$ $q'$ to the domes $k k'$. Other means may, however, be employed to produce an air-pressure slightly exceeding that of the atmosphere upon the surface of the liquid in the tank $m$. The shoulder of each of the domes $k$ $k'$ is furnished with a ring operating to intercept or check the water when the flannel or other covering is dry, and then there would be a tendency for the water to flow over the surface of the covering without properly moistening it. This is only designed as a precautionary device for retarding the flow of the water when the surface is dry, and to give the covering time to absorb a portion of the water.

The heating-vessel $a$ may be supplied with liquid in various modes. In the apparatus represented in the accompanying drawings it is assumed that water is the liquid under treatment. In such a case I prefer to supply the said vessel with the overflow from the cooling-water applied to the exterior of the dome $k$, this water having already had its temperature considerably raised.

The means of collecting the water that flows from the exterior of dome $k$ and conveying it to a suitable receptacle may be of any kind having substantially the character shown.

I employ a trough, $r$, at the base of the dome to receive the water, and any suitable pipe, $r^2$, to convey it to a receptacle. This receptacle is mounted on a vertical pivot, $s$, and is provided at its lower extremity with a nozzle, $s'$, suitably formed for making a tight joint upon the inlet to the heating-vessel. The lower extremity of the latter bends laterally, as shown, and terminates in a mouth, against which the said nozzle is forced by means of the set-screw $t$, fitted in a portion of the frame $g$. The arrangement is more particularly adapted for use with liquids—such as salt-water—containing a large amount of impurity, which, on being precipitated, requires periodical removal.

In order to facilitate the withdrawal of the vessel $a$ and receptacle $s$ for cleansing or other purposes, the chamber $k^2$ is mounted upon an arm, $u$, pivoted at $u'$. Upon removal of the fastening $u^2$ the chamber $k^2$ (carrying upon the internal ring, $v$, the domes $k$ $k'$) may be raised and turned back, the orifice $m'$ being meantime temporarily closed to prevent the escape of liquid from the tank $m$.

In order to keep the distilled liquid which flows from the inner surface of the domes separate from the impure water that flows from the outer surface of the same, I employ, as I have explained, separate conduits or conducting devices for these liquids, the same comprising annular troughs connected by pipes of any kind with the respective receiving-vessels. For example, the annular trough $n$ receives the distilled liquid from the inner surface of dome $k$, which liquid is conveyed thence by any form of conduit to vessel $p$. The impure water which flows from the exterior surface of the dome $k$ is received in an annular trough, $r$, and is conveyed by any form of conduit or pipe from said trough to the receptacle $s$. The arrangement of the conveying-pipes that lead the liquids from the troughs to the receiving-vessels is not important, and is within the knowledge of any ordinarily skilled workman.

Apparatus of the kind described is specially applicable for service in small boats at sea, for the purpose of preparing from sea-water small quantities of distilled water for drinking purposes.

I make no claim to the heat-generating mechanism or apparatus of itself, as such devices are known and have been before proposed for this purpose; but What I do claim is—

1. The combination of the domes $k$ and $k'$, the troughs $n$ and $n'$, the troughs $r$ and $r'$, the distilling-vessel $a$, and the rubber for producing heat by friction in the liquid in the vessel $a$, substantially as set forth.

2. The combination of the inclosing-chamber $k^2$, the water-tank $m$, the domes $k$ and $k'$, the several channels for carrying off the distilled water, the vessel $a$, arranged within dome $k$, and the adjustable rotary rubber $b$, arranged to rotate in contact with the vessel $a$, substantially as described.

LIONEL HARVEY PEARCE.

Witnesses:
G. G. M. HARDINGHAM,
C. W. LEES.